Jan. 14, 1941.    D. B. OLEN    2,228,581
FOUR WHEEL DRIVE POWER TRANSFER SET
Filed May 11, 1940    2 Sheets-Sheet 1
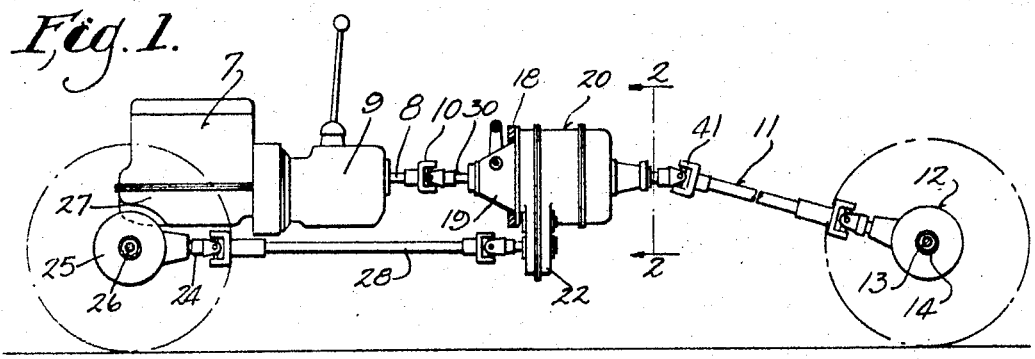
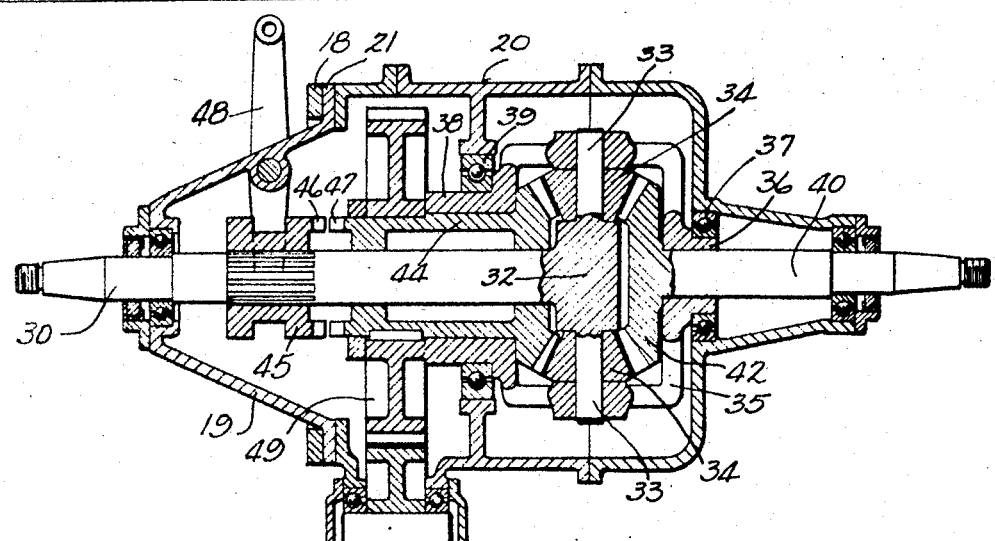
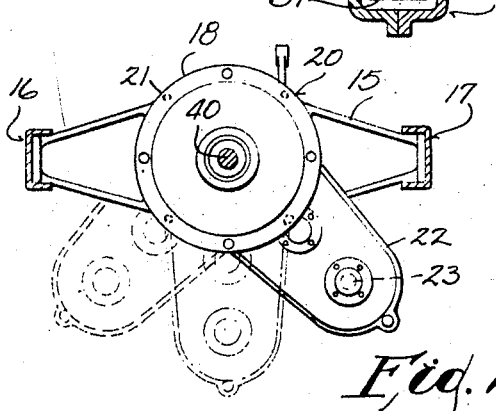
INVENTOR
DONALD B. OLEN
BY
Wheeler, Wheeler & Wheeler
ATTORNEYS

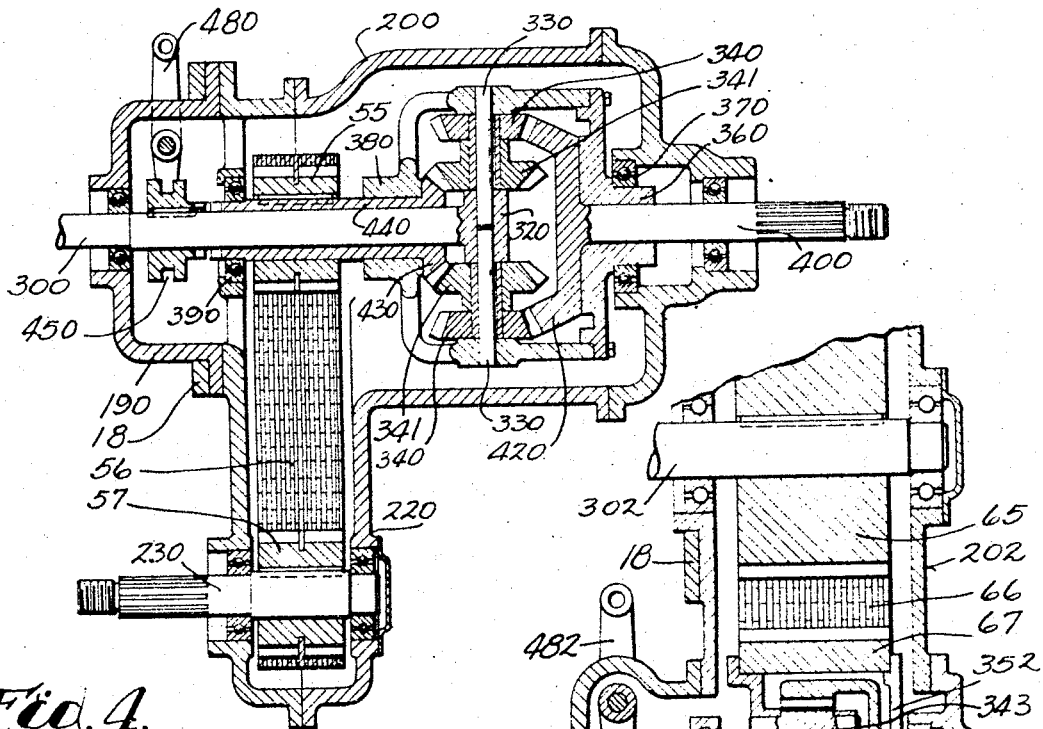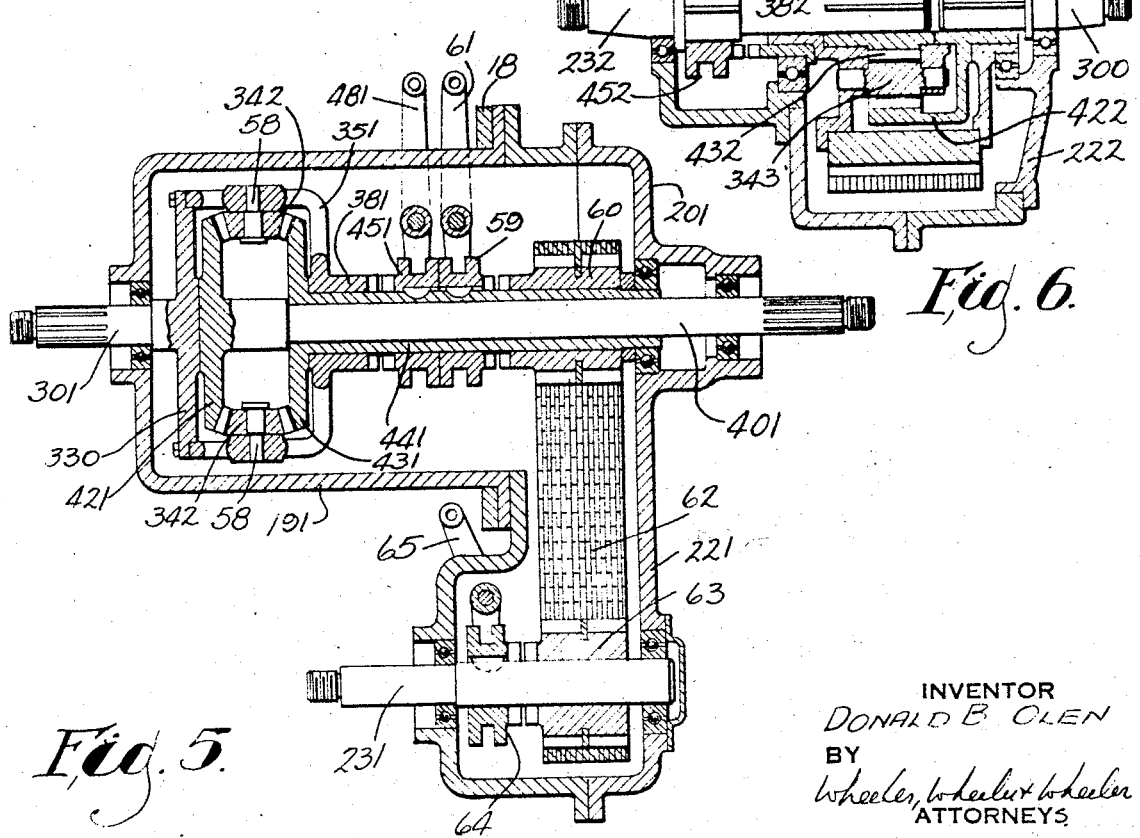

Patented Jan. 14, 1941

2,228,581

UNITED STATES PATENT OFFICE 2,228,581

FOUR WHEEL DRIVE POWER TRANSFER SET

Donald B. Olen, Clintonville, Wis., assignor to Four Wheel Drive Auto Company, Clintonville, Wis., a corporation of Wisconsin Application May 11, 1940, Serial No. 334,546

9 Claims. (Cl. 74—310)

This invention relates to improvements in four wheel drive power transfer sets.

One of the primary objects of the invention is to provide a suitable conversion unit adaptable for changing any or substantially any rear drive vehicle to a four wheel drive vehicle by the provision of a special intermediate differential set to be incorporated at substantially the level of the engine crank shaft directly behind the transmission without otherwise interfering with the normal drive to the rear axle, power being taken off from one side of this intermediate differential and delivered downwardly to a lower level from which a front live axle may be driven. In this connection it is a very important objective of the invention to provide a device in which the entire assembly may be indexed with reference to its mounting plate to dispose of the power take-off shaft either centrally or at one side or the other of the chassis so that the drive shaft to the front live axle may be so positioned as to clear the engine crank case, or other intervening parts, should this be necessary. This is one of the features which makes the device adaptable for the conversion of existing vehicles.

Other objects of the invention include: clutch means whereby only one axle need be driven when desired; an arrangement whereby the lower or offset power take-off may be used to drive the rear live axle as well as the front live axle when desired; the provision of means whereby the differential is adapted to deliver a greater proportion of the power to one of the axles than to the other, the rear axle being normally supplied with the greater amount of power; and the provision of suitable differential constructions to permit of the foregoing drives and arrangements.

Other objects will be apparent to those skilled in the art upon analysis of the following disclosure of the invention.

In the drawings:

Fig. 1 is a diagrammatic view partially in side elevation and partially in section showing the transmission of power from an engine to front and rear live axles in accordance with the present invention.

Fig. 2 is a view in transverse section through the frame and drive shaft as shown at 2—2 in Fig. 1.

Fig. 3 is an enlarged view in vertical axial section through a transmission case and center differential structure embodying the invention.

Fig. 4 is a view similar to Fig. 3 showing a modified arrangement giving power preference to the rear axle.

Fig. 5 is a view similar to Fig. 3 showing a further modified embodiment of the invention.

Fig. 6 is a fragmentary view similar to Fig. 3 showing a still further modified embodiment of my invention.

Like parts are identified by the same reference characters throughout the several views.

As above indicated, this invention is particularly designed for use in converting existing vehicles to four wheel drives. It is, however, adapted for original installation in four wheel drive vehicles.

In the conventional two wheel drive vehicle there is an engine 7 having its crank shaft (not shown) substantially at the level of the drive shaft 8 to which power is transmitted through any suitable change speed gear set 9. It is usual for the shaft 8 to drive through a universal joint 10 the drive shaft 11 which actuates the conventional differential (not shown) in differential case 12 to turn the live axle 13 which is housed in the lower bearing axle 14.

In accordance with the present invention a yoke at 15 is provided to span the space between the side frame channels 16 and 17, the yoke having an annular mid section 18 adapted to receive the front section 19 from the housing 20 for a center differential. The housing 20 may be in any desired number of sections but the mounting section next to the yoke 18 is provided with a series of ears 21 which, as shown in Fig. 2, are preferably at least eight in number and serve to carry the entire differential case 20 from the yoke 18 in a manner to permit the differential case to be indexed in its entirety between the various angular positions such as the three positions shown in full and dotted lines in Fig. 2 by way of illustrating this feature. By indexing the differential housing in this manner, or at least the portion thereof which carries the downward extension at 22, the driven shaft 23 journaled in such extension may be made to register as nearly as necessary with the input shaft 24 of the front wheel differential case 25 which drives the front live axle 26. As indicated in Fig. 1, this differential case 25 is necessarily located at the right of the vehicle in order to clear the depending crank case 27 of the engine 7. By indexing the housing portion 22 of the center differential case 20 to the position shown in full lines in Fig. 2, the driven shaft 23 is offset to the right and not only the front differential case 25, but also the line shaft 28, are located at one side of the engine crank case and associated parts.

Reference to Fig. 3 will disclose the interior of one embodiment of my center differential and transmission case. The power input shaft 30 receives motion from universal joint 10 and has a bearing in the stationary or non-indexing case portion 19. At its end it is provided with the hub 32 of a spider having radial arms 33 upon which the differential pinions 34 are mounted. At their ends the arms 33 may engage in a shell 35 having a small diameter hub 36 provided with a bearing 37 in the case 20. At the other side of the shell the large diameter hub 38 is mounted in bearings 39 in case 20 whereby the spider and shell and the differential pinions 34 turn as a unit with shaft 30, except when differential action occurs.

One of the power output shafts 40 is aligned with shaft 30 (and consequently, preferably, with the engine crank shaft). The shaft 40 connects through the universal 41 (Fig. 1) to the shortened line shaft 11 leading to the rear differential 12. Upon shaft 40 there is mounted a gear 42 meshing with the pinions 34 and disposed within the shell 35. The driven differential shaft 40 has a bearing within the hub 36 of the shell.

Similarly provided with a bearing in the larger hub 38 of the shell is the other driven differential shaft 44 which, in this instance, constitutes a sleeve surrounding the power input shaft 30. For locking this differential out of action a clutch member 45 is provided in splined relation to the power input shaft 30 having jaws 46 engageable with complementary jaws 47 on the end of the driven sleeve 44. Any suitable shifting device 48 is used for engaging and disengaging this clutch as desired.

The driven shaft 44 may be connected in any suitable manner with the power output shaft 23. In the device shown in Fig. 3 a spur gear 49 transmits motion through an idler 50 in the case extension 22 to driven gear 51 on the driven shaft 23. The idler may be used or omitted as desired in order to rotate the driven shaft in the correct direction, this depending somewhat of course on the direction in which the mechanism is coupled to turn the live axle 26 within the front differential housing 25. If desired, and if the direction of rotation permits, I may employ such mechanism as a silent chain for driving the power output shaft from the center differential in the manner suggested in Figs. 4 to 6 inclusive.

In Fig. 4 the shafts 300 and 400 correspond to shafts 30 and 40 already described. A stationary part of the center differential housing 190 corresponds to that shown at 19 in Fig. 3. The rest of the housing 200, while different in shape, corresponds functionally to the housing 20 shown in Fig. 2. The power input shaft 300 carries the hub 320 of the spider having radial arms 330. One hub 360 is provided with a bearing 370 in the case 200 while the other hub 380 has a bearing on the outside of the sleeve 440 which surrounds the power input shaft 300 and has a bearing at 390 in the case.

In this instance the bevel pinions of the differential are of differential sizes, each pinion being duplex and comprising an outer pinion 340 and an inner pinion 341 connected in pairs on common sleeves. Thereby the pinions 340 are adapted to mesh with a relatively large ring gear 420 while the pinions 341 mesh with a smaller gear 430 on output shaft 440. Since each pinion 340 turns as a unit with the contiguous pinion 341, it will be apparent that without differential movement of the gears and pinions greater power will be transmitted to the output shaft 30 than to the output shaft 440.

This device, like all the devices herein disclosed, is adapted for indexing adjustment with respect to the yoke 18. The shaft 440 in this instance carries a sprocket 55 which, by means of the "silent chain" 56, drives a sprocket 57 on the output shaft 230 from which motion is transmitted to the front axle as in Fig. 1.

The locking device 450 controlled by lever 480 prevents differential action in the center differential just as in the structure shown in Fig. 2.

In the device shown in Fig. 5 the yoke 18 is located near the rear rather than the forward end of the casing. Consequently the forward section 191 of the casing is relatively large and the indexing section 201 thereof is relatively small. The spider arms 330 carried by the power input shaft 301 are located outside the differential gear set to drive the spider shell 351, on the stud shafts 58 of which the pinions 342 are located. In this instance the gear 421 carried by the differential shaft 401 is located at the forward side of the differential set and such shaft extends through the sleeve shaft 441 upon which the differential gear 431 is mounted. The locking clutch 451 is splined to the sleeve shaft 441 to engage the hub 381 of the spider shell subject to the control of the lever 481. A similar clutch member 59 engages the hub of the sprocket 60 subject to the control of lever 61, whereby motion may be transmitted or interrupted as desired to drive the front axle through the chain 62 which connects sprocket 60 with sprocket 63 mounted loosely on the output shaft 231. Another clutch at 64 controlled by lever 65 and splined to the power output shaft 231 enables the power output shaft to be clutched to sprocket 63 as desired. Usually the levers 61 and 65 will be arranged for concurrent operation so that by disengaging both clutches the chain 62 will remain entirely idle when it is not desired to drive the front live axle, clutch lever 481 being preferably moved concurrently in an opposite direction to engage the clutch member 451 in that event so as to transmit all power through the locked center differential to the rear axle.

In the construction shown in Fig. 6 the differential set is located at the lower level and both the front and rear live axles are actuated from the lower level. In this construction the portion 202 of the transfer case which indexes with respect to the supporting yoke 18 comprises substantially the whole thereof. The power input shaft 302 carries only the driving sprocket 65 from which chain 66 transmits motion to sprocket 67 comprising the outer periphery of the differential shaft 352. In order to employ a compensating action such as that described in connection with Fig. 4, the particular differential illustrated in Fig. 6 uses spur pinions 343 between the end wheel 422 on the power output shaft 300 and the spur gear 432 on the output shaft 232 to transmit motion from the differential shell to the forward live axle to shaft 232 and the rearward live axle to shaft 300. In this instance the differential lock 452 controlled by lever 482 connects the power output shaft 232, to which the lock clutch 452 is splined, with suitable jaw teeth on the hub 382 of the differential shell.

As in the case of all the other differentials herein disclosed, the depending portion 222 of the differential casing 202 may be indexed to various angular positions with respect to the supporting yoke 18 in the manner shown in Fig. 2. In any position of adjustment the difference in radius between the ring gear 422 and the spur gear 432 will give a power advantage to the rear live axle which, assuming it to be bearing the large proportion of the load on the vehicle, will not slip as readily as the front live axle and hence can use more power without requiring differential action. In the event that slippage occurs in either axle the center differential may be locked, in all of the constructions herein disclosed, until all wheels regain traction.

While the construction shown in Fig. 6 is advantageous for certain purposes, it is ordinarily preferable for the purposes of the present invention that the power to the rear axle should be taken off at the level of the engine crank shaft in the manner shown in Figs. 1, 2, 4 and 5, and the various differential structures herein illustrated are merely typical of many others which may be used to effectuate the purposes of this invention and to permit the rear axle to be driven from a shaft at crank shaft level while the front axle is driven from a lower level either centrally or at either side of the chassis by indexing the depending portion 22, 220, 221, 222, with respect to the stationary supporting yoke 18.

I claim:

1. A combination center differential and transfer set for four wheel drive vehicles comprising a supporting yoke, a case mounted for indexing adjustment in said yoke, an input drive shaft centrally disposed in said yoke and about which said case is adjustable, said shaft having bearing support from said case, a plurality of output shafts provided with bearing support from said case, at least one of which is mounted in a position radially offset from said input shaft to be moved in the course of the indexing adjustment of the case, and differential and transfer mechanism within the case providing an operative connection between said shafts.

2. A device of the character described, comprising the combination with a power input shaft, of a gear case having bearings for said shaft, means supporting said case for indexing adjustment respecting said shaft, said case having output shaft bearings located off center from said first mentioned shaft to partake of said adjustment, an output shaft in said last mentioned bearings, a second output shaft provided with bearings in said case, a differentially diametered gear set within said case comprising gears having means operatively connecting them with the respective output shafts, and pinions having mounting means in operative connection with said input shaft.

3. A device of the character described comprising the combination with a power input shaft of a casing in which said shaft has bearing supporting means, means mounting said casing for indexing movement about said shaft, a plurality of output shafts provided with bearings for said casing, at least one of which is radially offset from said input shaft whereby to partake of said indexing movement of said casing, differential and transfer mechanism in said casing operatively connecting said output shafts for differential movement and said input shaft for the driving of said output shafts, clutch means connecting one of said output shafts with said mechanism for releasable engagement therewith, and clutch means including operative connections engageable between portions of said differential mechanism for transmitting motion to the other of the output shafts irrespective of the output shaft provided with the clutch.

4. In a device of the character described, the combination with a power input shaft and a yoke, of casing means adjustable upon said yoke about said power input shaft, said casing means having a radial offset portion and being provided with output bearings therein adapted for indexing movement with said casing means about said input shaft, an output shaft in said bearings, a second output shaft provided with bearings in said casing means, and differential and transfer mechanism within said casing means operatively connecting the output shafts for differential movement and to receive motion from the input shaft in any indexed position of said casing means respecting said yoke.

5. A conversion center differential and transfer set comprising the combination with an input shaft and an output shaft aligned therewith, of a second output shaft radially offset from the axis of alignment of the first two shafts, casing means providing bearings for the several shafts, a yoke upon which said casing means is mounted for indexing adjustment about the axis of the first two shafts, whereby to index the offset output shaft about said axis, differential mechanism within said casing means including a driving pinion set in operative connection with the input shaft, a driven gear mounted on the first mentioned output shaft, and a second driven gear provided with transfer connections to the offset output shaft, said gears being in operative mesh with said pinions.

6. A device of the character described comprising the combination with a power input shaft and an output shaft in axial alignment therewith, of casing means provided with an indexing support on which said casing means is rotatably adjustable about said axis, a second driven shaft in said casing means radially offset from said axis to partake of the indexing adjustment of said casing, a driven sleeve surrounding one of said shafts, a driving differential pinion set mounted on the input shaft, driven gears mounted respectively on said sleeve and on said first mentioned output shaft and meshing with the pinions of said set, and transfer means connecting said sleeve with the radially offset output shaft to transmit thereto through the said differential pinions and gears the motion of the input shaft in operative differential connection with the first mentioned output shaft.

7. A combinaion center differential and transfer set for four wheel drive vehicles comprising a supporting yoke, a case mounted for indexing adjustment in said yoke, an input drive shaft centrally disposed in said yoke and about which said case is adjustable, a plurality of output shafts provided with bearing support from said case, at least one of which is mounted in a position radially offset from said input shaft to be moved in the course of the indexing adjustment of the case, and differential and transfer mechanism within the case providing an operative connection between said shafts.

8. A combination center differential and transfer set for four wheel drive vehicles comprising a supporting yoke, a case mounted for indexing adjustment in said yoke, an input drive shaft centrally disposed in said yoke and about which said case is adjustable, said shaft having bearing support from said case, a plurality of output shafts provided with bearing support from said case, at least one of which is mounted in a position radially offset from said input shaft to be moved in the course of the indexing adjustment of the case, and transfer mechanism within the case providing an operative connection between said shafts.

9. A combination center differential and transfer set for four wheel drive vehicles comprising a supporting yoke, a case mounted for indexing adjustment in said yoke, an input drive shaft centrally disposed in said yoke and about which said case is adjustable, a plurality of output shafts provided with bearing support from said case, at least one of which is mounted in a position radially offset from said input shaft to be moved in the course of the indexing adjustment of the case, and transfer mechanism within the case providing an operative connection between said shafts.

DONALD B. OLEN.